United States Patent [19]

Lerner

[11] Patent Number: 5,195,500
[45] Date of Patent: Mar. 23, 1993

[54] OVEN DEVICE

[75] Inventor: Robert A. Lerner, Albany, Calif.

[73] Assignee: Traveling Light, Inc., Albany, Calif.

[21] Appl. No.: 752,792

[22] Filed: Aug. 30, 1991

[51] Int. Cl.[5] .......................... A47J 37/00; F24B 3/00
[52] U.S. Cl. .................................... 126/29; 126/9 R; 126/19 M
[58] Field of Search ...................... 126/29, 275 R, 9 R, 126/30, 333, 19 M

[56] References Cited

U.S. PATENT DOCUMENTS

| 2,511,682 | 6/1950 | Allen | 126/299 C |
| 2,568,637 | 9/1951 | Jardim | 126/299 C |
| 3,428,039 | 2/1969 | Desmoulins . | |
| 3,892,222 | 7/1975 | Darbo . | |
| 4,014,315 | 3/1977 | Lagunilla . | |
| 4,051,836 | 10/1977 | Lagunilla-Leca . | |
| 4,320,736 | 3/1982 | Sharon . | |

Primary Examiner—Larry Jones
Attorney, Agent, or Firm—Townsend and Townsend

[57] ABSTRACT

An oven device (4) is adapted for use with a source of heat (24), such as a camp stove, and a cooking utensil (6), such as a covered (12) pot or pan (8), positioned over and separated from the heat source by a heat shield (20). The oven device includes a high temperature flexible, foldable convection dome, such as one made of aluminized fiberglass, having a vertically oriented sidewall (34) and a top (36). The top has a central vent opening (40). The convection dome is supported on the lid covering the pan by a number of radially extending pockets (42). The material from which the convention dome is made of is flexible enough to permit the convection dome to be folded up into a compact rectangular configuration but stiff enough to allow the pockets to support the convection dome above the lid of the pan with the sidewalls of the convection dome spaced apart from the sides of the pan. This provides a convection path up past the sidewalls of the pan and radially inwardly over the lid and then out through the vent opening convection dome. The temperature of the air passing through the vent opening is monitored by a thermometer (18) incorporated into a handle (14) on the lid.

20 Claims, 5 Drawing Sheets

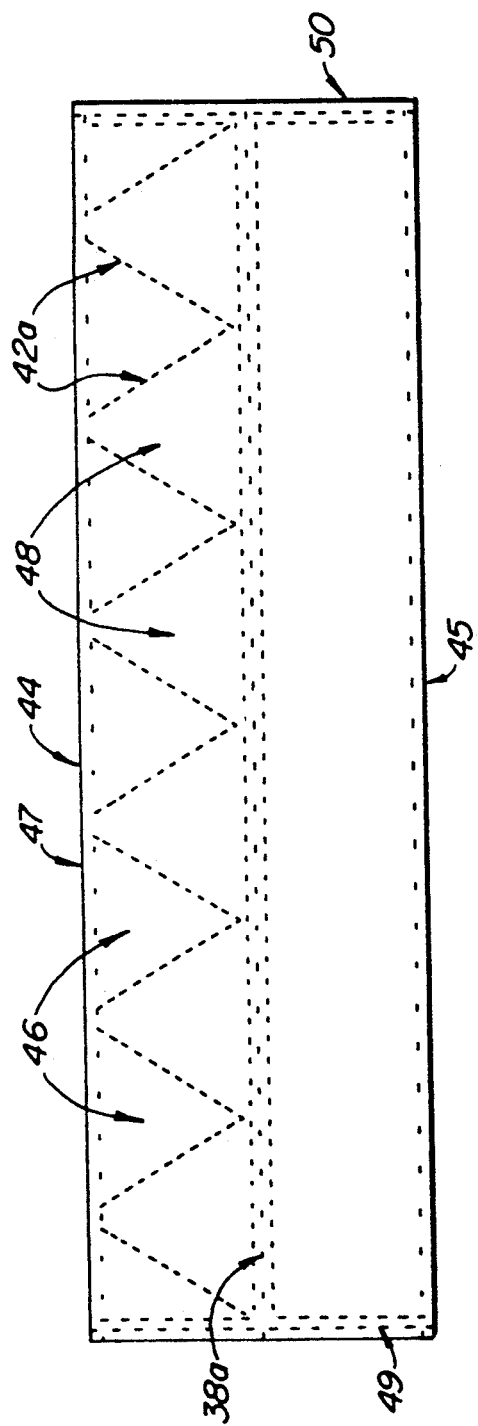
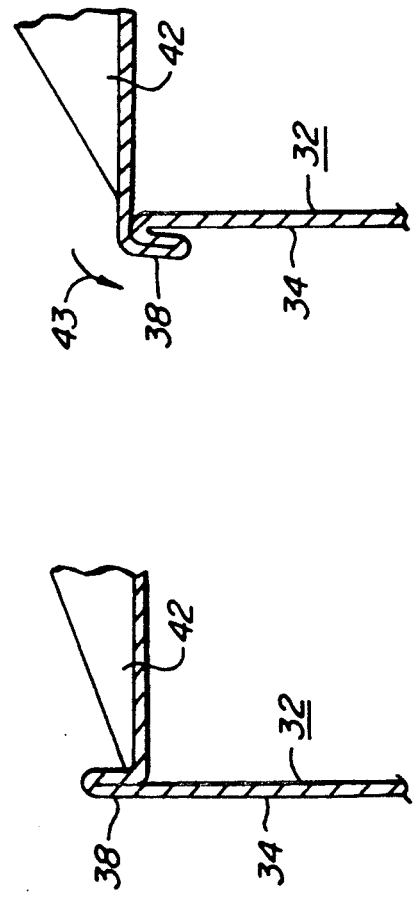
FIG. 4.
FIG. 4A.
FIG. 4B.

OVEN DEVICE

BACKGROUND OF THE INVENTION

Energy conservation is an important goal and promises to continue being of prime importance for the foreseeable future. A commonly used energy source is a burner, either electric or gas, used for cooking. One of the problems with conventional burners is that they are rather energy inefficient in that much energy is lost to the surrounding environment and not transferred into the pot or pan on the burner. While always inefficient and wasteful, this loss of heat becomes especially significant when camping. When camping, or at other such times, the burner may provide a lower heat output than at fixed installations, such as in the home. Also, being outside and subject to cold weather and blowing winds, the efficiency of outdoor burner is often further reduced. This may not be too much of a problem if the supply of fuel is large and if time constraints are not a problem. However, it is inefficient and can provide serious constraints to those who are either under time restrictions or restrictions as to the amount of fuel they can or are willing to carry with them, such as on a backpacking trip.

Another problem with conventional burners is that they are not suited for baking. Cook tops provide bottom heat and thus are not particularly suited for baking foods such as biscuits, cakes or pizza. While various camping ovens have been developed, they are generally of the type which use folding metal sheets used as reflectors to concentrate and create an oven region within the reflectors. They are relatively heavy, bulky and not particularly suited for backpacking, bicycling, canoeing and other back-country travel.

SUMMARY OF THE INVENTION

The present invention is directed to an oven device which not only increases the efficiency of cooking in pots and pans but also permits a source of heat from a burner to be used as a source of heat for baking.

The oven device is adapted for use with a source of heat, such as a camp stove, and a cooking utensil, such as a covered pot or pan, positioned over the heat source. The oven device includes a high temperature convection dome made of high temperature, flexible, foldable material, such as aluminized fiberglass, having a circumferential, generally vertically oriented sidewall and a top. Other high temperature materials, such as metal foil, the high temperature jacketing material sold by Chemfab Corporation of North Bennington, Vt., or the high temperature Hypalon-coated glass cloth sold by Wilson Sales Co. of South DelMonte, Calif. as Weldoglass, could be used as well. The top has a centrally located vent opening.

The oven device also includes one or more support elements which support the convection dome a distance above the lid covering the pot or pan. Preferably the support elements are in the form of a number of radially and downwardly extending pockets. The material from which the convection dome is made is preferably flexible enough to permit the convection dome to be folded into a compact configuration but stiff enough to allow the pockets to support the convection dome above the lid of the pot or pan with the sidewalls of the convection dome spaced apart from the sides of the pot or pan. This provides a convection path up past the sidewalls of the pot or pan and radially inwardly over the lid and then out through the vent opening in the convection dome.

A reflector collar can be used with the oven device. The collar is situated beneath and radially outwardly of the burner grate so to reflect heat up towards the cooking utensil. The reflector collar also acts to thermally insulate the fuel tank of the stove when the fuel tank serves as the base of the stove. The outer edge of the reflector collar is positioned towards the lower edge of the convection dome. The space between the outer edge of the reflector collar and the lower edge of the convection dome is controlled to restrict the speed of the convective air currents within the convection dome to increase the air temperature within the convection dome and enhance oven performance.

The temperature of the heated gas passing over the lid of the pot or pan and out through the vent opening can be monitored using a thermometer. One way to do so is to incorporate a thermometer into the handle mounted to the lid covering the pot or pan. The temperature of the vented gas can be used to monitor the temperature within the pot or pan while baking.

One of the primary advantages of the invention is that the oven device can be used in many different situations, such as at home and while camping, to increase the thermal efficiency while cooking. This helps to preserve scarce resources using a simple and relatively inexpensive oven device which concentrates the heat over and around the covered pot or pan thus permitting the use of a lower energy output setting at the heat source. The oven device may also be useful in regions of the world where cooking fuel, such as wood, is scarce.

The present invention finds particular utility when used as a portable oven assembly by campers and backpackers. The invention not only helps conserve fuel when cooking in pots and pans, but also, when used with a heat shield between the cooking food and the burner, helps keep the food on the bottom from getting too hot to allow the covered pot or pan to function as an oven. This is achieved in an efficient manner without the need to use bulky and relatively heavy metal sheet reflectors to create an oven environment.

Other features and advantages of the invention will appear from the following description in which the preferred embodiments have been set forth in detail in conjunction with the accompanying drawings.

BRIEF DESCRIPTION OF THE DRAWINGS

FIG. 4 shows a pattern from which the oven device of FIGS. 1-3 is made with stitching patterns indicated by dotted lines;

FIGS. 4A and 4B are enlarged cross-sectional views of a portion of the oven device of FIG. 2 at the intersection of the top and the sidewall;

DESCRIPTION OF THE PREFERRED EMBODIMENTS

Figure 1:
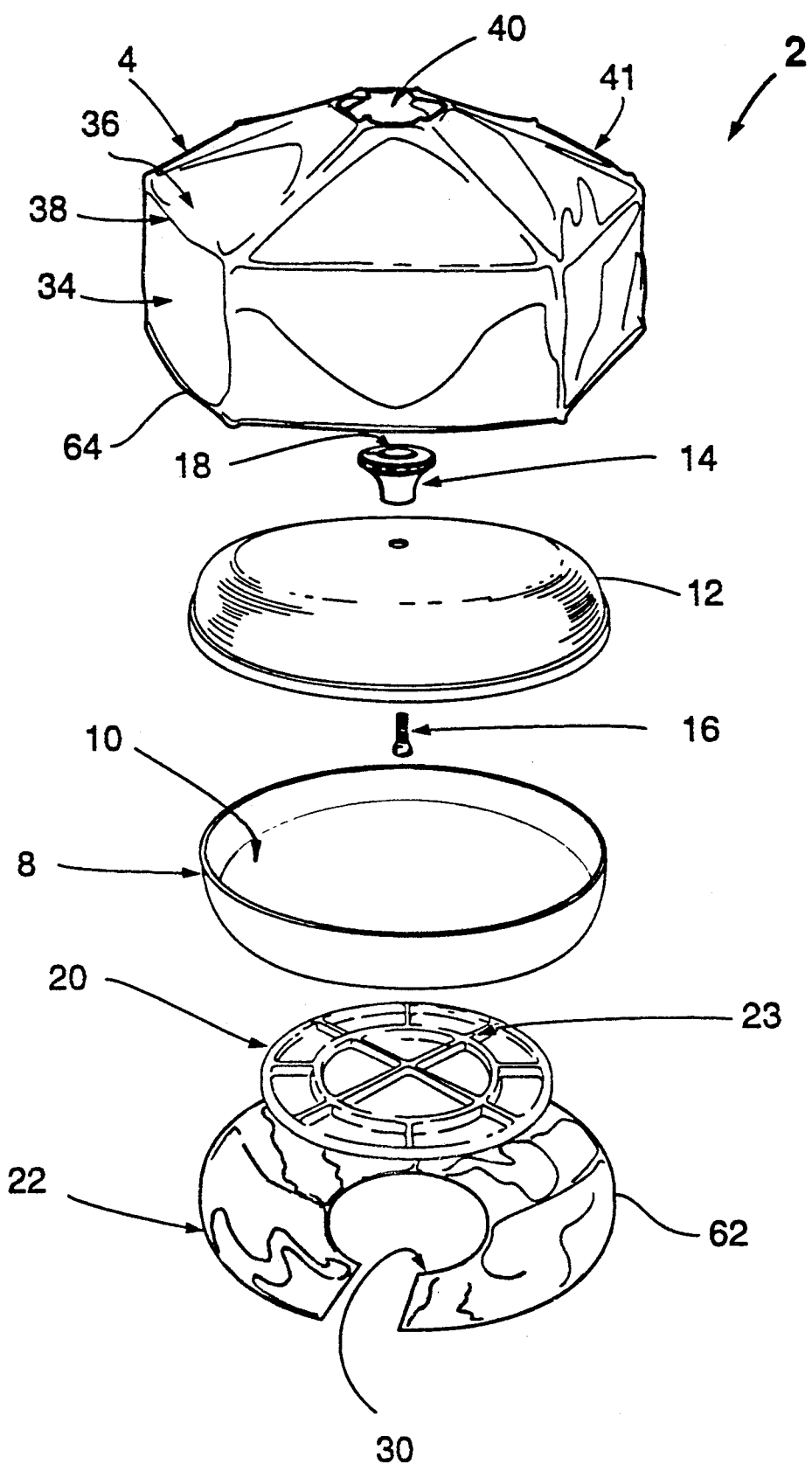
FIG. 1 is an exploded perspective view of a portable oven assembly made according to the invention.

FIG. 1 illustrates a portable oven assembly 2 including an oven device 4 sized to fit over a cooking utensil 6. Cooking utensil 6 includes a pan 8 having a non-stick interior 10 and a cover 12 to which a knob 14 is mounted using a thumb screw 16. Knob 14 includes an integrally mounted thermometer 18 used to indicate the temperature of the air exiting oven device 4 as discussed in more detail below. Assembly 2 also includes a heat shield 20, upon which pan 8 rests, and a heat reflector 22, typically made of heavy aluminum foil. Heat shield 20 is made of a 0.016 inch thick 304 stainless steel stamping with a raised grid pattern 23 formed therein to stiffen and stabilize the heat shield and to provide an air space between pan 8 and the main body of the heat shield. Heat shield 20 could also be made of 304 stainless steel mesh wire or expanded metal sandwiching a ceramic fiber mat, the three-layered structure bound at the circumferential edge by a rolled metal ring.

Figure 2:
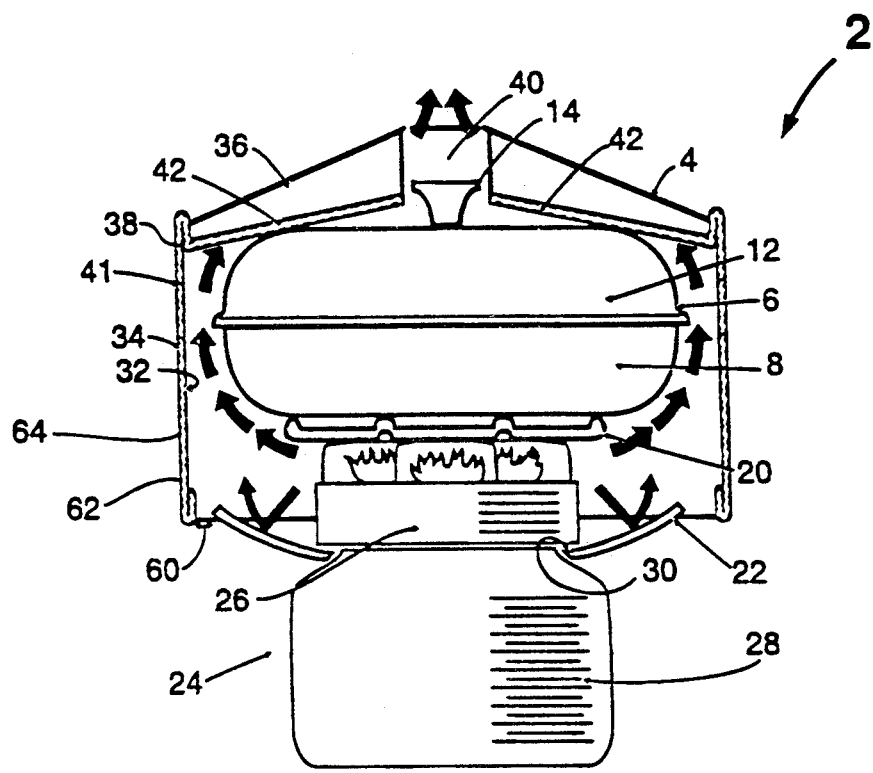
FIG. 2 is a side view of the assembly of FIG. 1 used with a portable, single burner, camp stove-type of heat source illustrating the reflection of radiant energy by the reflector and the convection currents within the fabric oven device.

As shown in FIG. 2, assembly 2 can be used with a camp stove-type heat source 24. Heat source 24 includes a burner 26 upon which heat shield 20 rests. Heat source 24 also includes a base 28 holding a supply of fuel, typically propane, white gas and butane. As is shown in FIG. 2, pan 8 rests on heat shield 20 which itself is supported by burner 26. Radiant energy is directed up towards cooking utensil 6 by heat reflector 22. Heat reflector 22 is preferably made of stiff, reflective aluminum foil with the inside circumference 30 cut to fit snugly on heat source 24 between burner 26 and base 28. This use of reflector 22 not only increases the thermal efficiency of oven assembly 2, but also helps to keep base 28, which contains the cooking fuel in this embodiment, from getting too hot.

Figure 3:
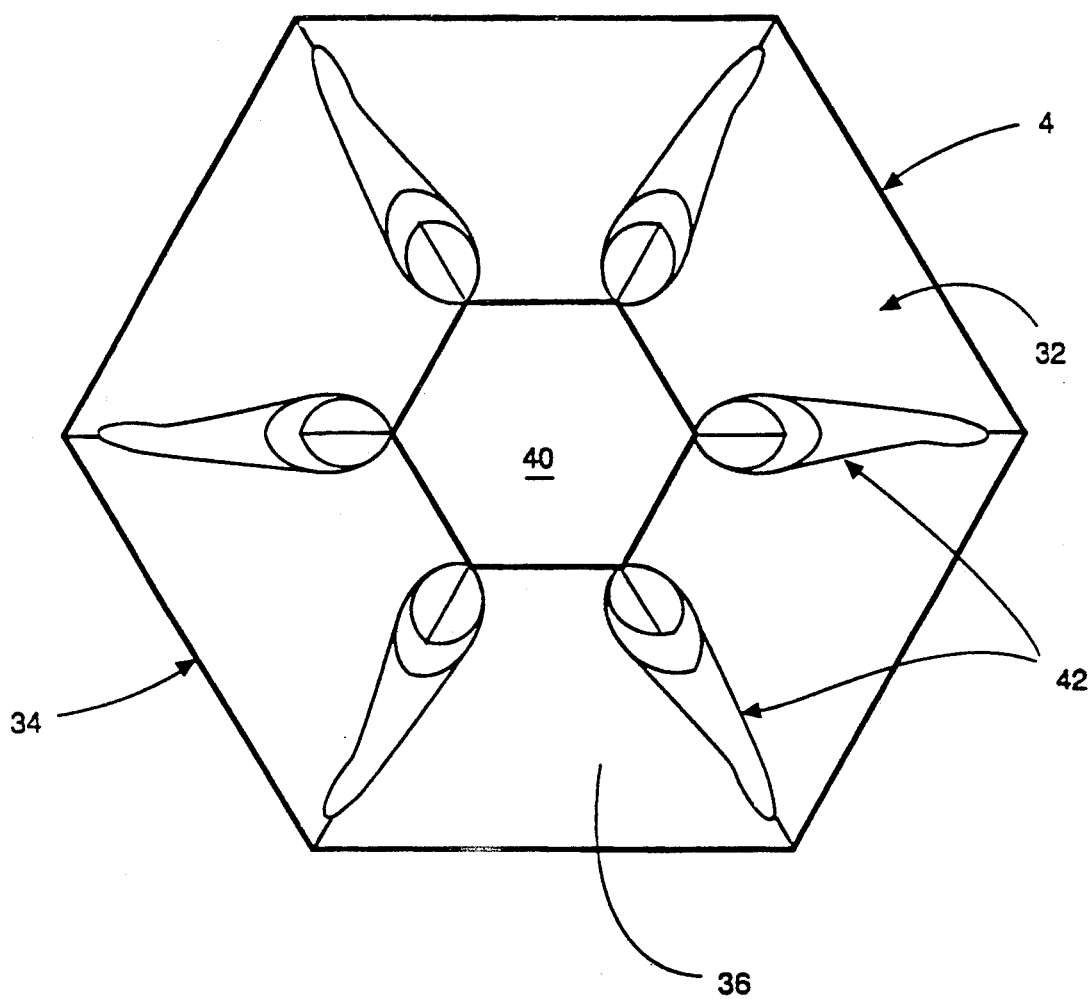
FIG. 3 illustrates the oven device of FIG. 1 in an inverted condition illustrating the fabric support pockets extending from the inside surface of the top of the convection dome.

Oven device 4 is made from aluminized fiberglass fabric, such as that manufactured by Gentex Corporation of Carbondale, Pa., as 1025 aluminized fiberglass, 11 ounce. The inside surface 32 of oven device 4 is highly reflective for enhanced heat retention. Oven device 4 includes a generally hexagonal circumferential sidewall 34 and a slightly domed top 36 extending from the upper circumferential edge 38 of sidewall 34. Top 36 defines a central vent opening 40 to permit convection currents within oven device 4. Sidewall 34 and top 36 together constitute a convection dome 41. Oven device 4 also includes six fabric support pockets 42 extending downwardly from top 36. As shown in FIG. 3, convection dome 41 is supported above and is spaced apart from cover 12 by pockets 42; pockets 42 are spaced apart from one another so that convection currents can pass over cover 12. Oven device 4 is sized so that sidewall 34 is spaced apart from the side of cooking utensil 6 to permit the convection currents to flow up, around and over the cooking utensil as illustrated in FIG. 2.

FIG. 4 illustrates a pattern 44 used to create oven device 4. Pattern 44 illustrates the various seams used to create oven device 4 by dashed lines. Seam 38a corresponds to edge 38 and extends entirely along the length of pattern 44. Pocket seams 42a extend at angles from seam 38a. The sharpened V regions 46 become support pockets 42 while the intervening regions 48 together constitute top 36. While it may not be necessary to form a seam 38a along circumferential edge 38, it is helpful to maintain the desired shape of oven device 4 during use.

Oven device 4 is made by first hemming both long edges 45, 47. Short edges 49, 50 are sewn together to form a cylinder. The cylinder is rolled down on itself, with reflective inside surface facing itself and a middle hem 38a, corresponding to edge 38, is stitched. The device is then opened up into a full cylinder and pockets are formed by sewing at adjacent hems 42a to create six pockets 42.

FIG. 4A shows edge 38 in its upstanding configuration of FIG. 2. However, it has been found that by bending edge 38 in the direction of arrow 43 at the corners of sidewall 34, see FIG. 4B, additional stability is provided oven device 4.

Oven device 4 is preferably and advantageously made from a single length of fabric as illustrated by pattern 44. However, oven device 4 could be made from a number of sections of fabric. In addition, support pockets 42 could be replaced by other types of supports which maintain convection dome situation an acceptable distance above cooking utensil 6. For example, oven device 4 could be made from material which lacks the ability to support itself, as does the fabric from which oven device 4 is made, but used in conjunction with a wire frame which not only provides acceptable shape to the oven device but also supports the oven device a desired distance above the cooking utensil.

Figure 5:
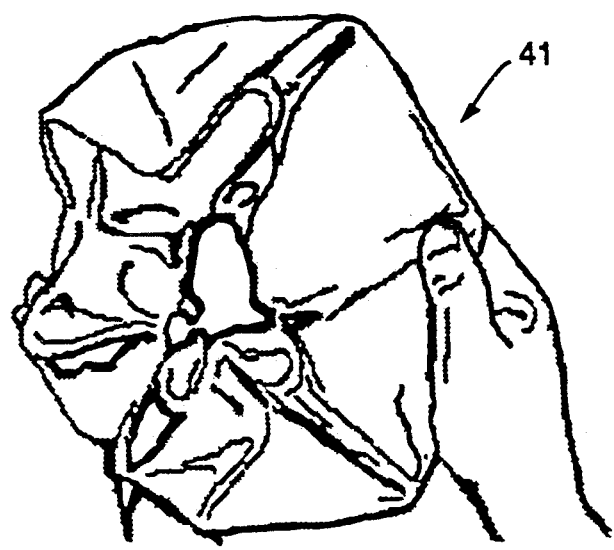
FIGS. 5 and 6 illustrate folding the oven device of FIG. 1 to a compact rectangular configuration.
Figure 6:

One of the advantages of oven device 4 being made of a fabric is that it can be collapsed to a small rectangular-shaped packet. This is accomplished, as suggested in FIG. 5, by first inverting oven device 4 and collapsing sidewall down onto top 36. Oven device 4 is then manipulated into a flattened rectangular configuration as suggested in FIG. 6. Oven device 4 is thus easily storable in a small space.

In use, oven assembly 2 is used to bake by first turning heat source 24 to a relatively low level. Thermometer 18 senses the temperature of the air passing through vent opening 40. With the preferred embodiment, a temperature reading of 200° F. (93° C.) corresponds to a conventional oven temperature of about 350° F. (177° C.). The temperature sensed by thermometer 18 should be increased gradually over the first five to ten minutes of heating as the food absorbs heat. Once oven assembly 2 reaches the desired temperature as indicated by thermometer 18, the temperature can be adjusted by adjusting the heat output of heat source 24. Direct exposure to wind should be avoided since wind will affect the proper convection currents up and around cooking utensil 6. To check for doneness of the contents of utensil 6, the user grasps knob 14, using a hotpad or other insulating material, through vent opening 40 and lifts oven device 4 and cover 12 together.

Reflector 22 can serve an additional function, in addition to reflecting heat towards cooking utensil 6. By adjusting the distance 60 between the outer periphery 62 of reflector 22 and the lower edge 64 of oven device 4, the amount of air drawn up by convection between oven device 4 and cooking utensil 6 can be controlled. This can be accomplished by varying the size and/or shape of reflector 22. By making reflector of a bendable material, the user can bend reflector 22 to adjust distance 60 according to the circumstances, such as the height of the cooking utensil, the ambient wind and so forth. By controlling distance 60, the user can control the amount of air drawn in by convection to a point where there is sufficient air for combustion but minimal excess air for maximum thermal efficiency.

Figure 7:
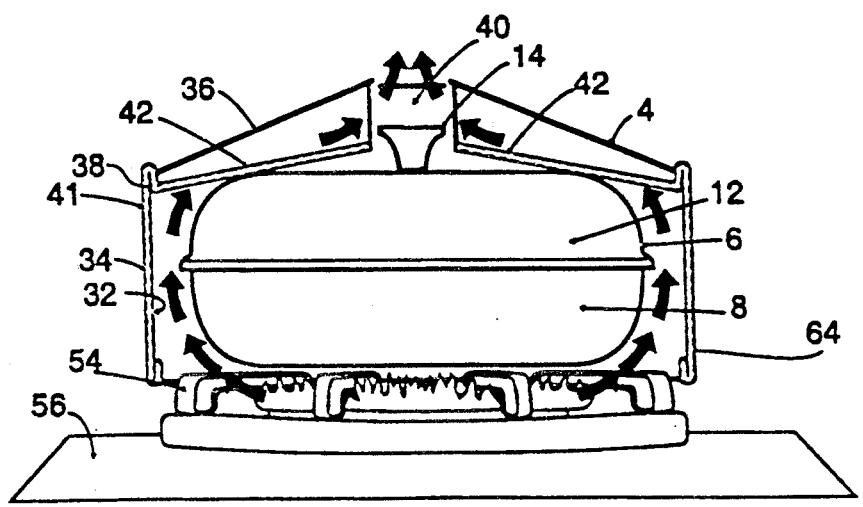
FIG. 7 is a view of FIG. 2 showing the use of a oven device of FIG. 2 supported by the cover on a pan, the pan resting on a burner on a stove, but without the use of the heat shield or reflector of FIG. 2.

FIG. 7 illustrates the use of oven device 4 with pan 8 on a conventional burner 54 on a cooktop or hotplate 56. In this case, the contents of the pan 8 are not intended to be baked, heat shield 20 is not used. Also, heat reflector 22 may be omitted since there is no supply of fuel directly below burner 54 as in the embodiment of FIG. 2. Oven device 4 acts in the same manner to raise the temperature of pan 8 to create a more efficient heating environment thus saving fuel and possibly shortening cooking time. In addition, oven device 4 helps to reduce the problem of differential cooking within cooking utensil 6 and reduces the problem of food sticking to the bottom of pan 8.

The aluminized fabric from which oven device is made is a good high temperature material. However, it is not suited for direct flame contact. In some cases the cooking utensil is small enough to allow flames to touch or get very near sidewall 34 of oven device 4. In such cases it may be desirable to use a cylindrical metal collar (not shown) positioned between the flames and the sidewall of the oven device to prevent this direct flame contact.

Other modifications and variations can be made to the disclosed embodiments without departing from the subject of the invention as defined in the following claims. For example, while the preferred embodiments have been described with reference to gas burners, other sources of heat, such as electric, could be used as well. Cooking utensil 6 could be made with an integral heat shield 20. Also, pan 8 could be used with heat shield 20, or other flat surface, placed on top of a rack inside of pan 8, rather than outside of pan 8, to prevent burning of food when baking.

What is claimed is:

1. An oven device, for use with a source of heat and a cooking utensil positioned over the source of heat, the cooking utensil having an upper portion and a sidewall portion, the oven device comprising:
   a high temperature flexible, foldable, fabric convection dome including a circumferential sidewall and a top, the top having a centrally located convection exhaust vent through which a convection exhaust flows; and
   means for supporting the convection dome on the upper portion of the cooking utensil with the top spaced apart from the upper portion and the circumferential sidewall spaced apart form the sidewall portion to provide a convection path up past the sidewall portion, over the upper portion and out the convection exhaust vent.

2. The oven device of claim 1 wherein the circumferential sidewall is generally hexagonal in shape.

3. The oven device of claim 1 wherein the convection dome is made from a single piece of high temperature flexible, foldable material.

4. The oven device of claim 1 wherein the convection dome is configured to be foldable to a generally rectangular configuration for storage.

5. The oven device of claim 1 wherein the supporting means includes a plurality of flexible, foldable pockets extending radially outwardly from the vent hole and downwardly from the top.

6. A portable oven assembly, for use with a burner-type source of heat, comprising:
   a cooking utensil having a cover;
   a high temperature flexible, fabric foldable convection dome including a circumferential sidewall and a top, the top having a centrally located convection exhaust vent though which a convection exhaust flows; and
   means for supporting the convection dome on the upper portion of the cooking utensil with the top spaced apart from the upper portion and the circumferential sidewall spaced apart form the sidewall portion to provide a convection path up past the sidewall portion, over the upper portion and out the convection exhaust vent.

7. The assembly of claim 6 further comprising a thermometer mounted to the cover at a position generally aligned with the convection exhaust vent.

8. The assembly of claim 6 further comprising a heat shield positionable between the source of heat and the cooking utensil.

9. The assembly of claim 6 further comprising a heat reflector positionable below the cooking utensil and also below and radially outwardly of the source of heat, the heat reflector adapted to reflect radiant energy towards the cooking utensil.

10. The assembly of claim 9 wherein the heat reflector includes means for adjusting convective heat flow between the convection dome and the cooking utensil.

11. The assembly of claim 6 further comprising means for adjusting convective heat flow between the convention dome and the cooking utensil.

12. The assembly of claim 6 wherein the circumferential sidewall is generally hexagonal in shape.

13. The assembly of claim 6 wherein the convection dome and the supporting means are made from a single piece of high temperature flexible, foldable material.

14. The assembly of claim 6 wherein the convection dome is configured to be foldable to a generally rectangular configuration for storage.

15. The oven device of claim 6 wherein the supporting means includes a plurality of flexible, foldable pockets extending radially outwardly from the vent hole and downwardly from the top.

16. A portable oven assembly, for use with a burner-type source of heat, comprising:
   a cooking utensil having a cover;
   a high temperature flexible, foldable, fabric convection dome including a circumferential sidewall and a top, the top having a centrally located convection exhaust vent through which a convection exhaust flows; and
   a thermometer mounted to the cover at a position generally aligned with the convection exhaust vent;
   a heat shield positionable between the source of heat and the cooking utensil;
   a heat reflector positionable below the cooking utensil and also below and radially outwardly of the source of heat, the heat reflector adapted to reflect radiant energy towards the cooking utensil; and
   means for supporting the convection dome on the upper portion of the cooking utensil with the top spaced apart from the upper portion and the circumferential sidewall spaced apart form the sidewall portion to provide a convection path up past the sidewall portion, over the upper portion and out the convection exhaust vent.

17. The assembly of claim 16 further comprising means for adjusting convective heat flow between the convention dome and the cooking utensil.

18. The assembly of claim 16 wherein:

the convection dome and the supporting means are made from a single piece of high temperature flexible, foldable material; and the supporting means includes a plurality of pockets extending radially outwardly form the convection exhaust vent and downwardly form the top.

19. An oven device, for use with a source of heat and a cooking utensil positioned over the source of heat, the cooking utensil having an upper portion and a sidewall portion, the oven device comprising:

a high temperature flexible, foldable convection dome including a circumferential sidewall and a top, the top having a centrally located vent opening through which a convection exhaust flows; and a plurality of flexible, foldable pockets extending radially outwardly from the convection exhaust vent and downwardly from the top so that the top is spaced apart form the upper portion and the circumferential sidewall spaced apart from the sidewall portion to provide a convection path up past the sidewall portion, over the upper portion and out the convection exhaust vent.

20. A portable oven assembly, for use with a burner-type source of heat, comprising:

a cooking utensil having a cover;

a high temperature flexible, foldable convection dome including a circumferential sidewall and a top, the top having a centrally located vent opening through which a convection exhaust flows; and a plurality of flexible, foldable pockets extending radially outwardly from the convection exhaust vent and downwardly from the top.

* * * * *